United States Patent [19]

Hanson

[11] Patent Number: 5,894,721
[45] Date of Patent: Apr. 20, 1999

[54] NOISE REDUCING STATOR ASSEMBLY FOR A GAS TURBINE ENGINE

[75] Inventor: Donald B. Hanson, Chester, Conn.

[73] Assignee: United Technologies Corporation, Hartford, Conn.

[21] Appl. No.: 08/780,072

[22] Filed: Dec. 23, 1996

Related U.S. Application Data.

[60] Provisional application No. 60/028,907, Oct. 21, 1996.

[51] Int. Cl.$^6$ ............................................. F02C 7/045
[52] U.S. Cl. ........................ 60/226.1; 181/222; 415/119
[58] Field of Search .......................... 60/204, 226.1; 181/213, 214, 222; 415/119, 199.4, 199.5, 209.1, 209.2, 209.3, 209.4, 210.1, 211.2

[56] References Cited

U.S. PATENT DOCUMENTS

| | | | |
|---|---|---|---|
| 3,477,231 | 11/1969 | Paulson | 181/222 |
| 3,685,611 | 8/1972 | Duvvuri | 181/33 H |
| 3,692,141 | 9/1972 | Labussiere et al. | 181/33 E |
| 3,702,220 | 11/1972 | Medawar et al. | 515/119 |
| 3,820,628 | 6/1974 | Hanson | 181/33 HC |
| 4,116,584 | 9/1978 | Bammert et al. | 415/209.1 |
| 4,240,250 | 12/1980 | Harris | 415/119 |
| 4,284,170 | 8/1981 | Larson et al. | 181/213 |
| 4,372,110 | 2/1983 | Cheng | 60/262 |
| 4,384,634 | 5/1983 | Shuttleworth et al. | 181/213 |
| 4,433,751 | 2/1984 | Bonneau | 181/213 |
| 4,452,335 | 6/1984 | Mathews et al. | 181/214 |
| 4,723,626 | 2/1988 | Carr et al. | 181/213 |
| 4,817,756 | 4/1989 | Carr et al. | 181/214 |
| 4,909,346 | 3/1990 | Torkelson | 181/213 |
| 4,969,535 | 11/1990 | Arcas et al. | 181/213 |
| 5,014,815 | 5/1991 | Arcas et al. | 181/213 |
| 5,060,471 | 10/1991 | Torkelson | 60/262 |
| 5,092,425 | 3/1992 | Shaw, Jr. | 181/213 |
| 5,127,602 | 7/1992 | Batey et al. | 244/1 N |
| 5,167,118 | 12/1992 | Torkelson | 60/226.1 |
| 5,203,164 | 4/1993 | Paulson | 60/226.1 |

OTHER PUBLICATIONS

NASA Contractor Report, NASA CR 2323, pp. 1–90. Nov., 1973.

Primary Examiner—Louis J. Casaregola
Attorney, Agent, or Firm—Monica G. Krasinski

[57] ABSTRACT

A stator assembly for reducing noise in the outermost portion of the working medium flow path is disclosed. Various construction details are developed which relate to the reduction in noise within the outer twenty percent (20%) of the working medium flow path. In one particular embodiment, an annular channel extends rearwardly from a location between the blades and the vanes for capturing a significant portion of the wake turbulent flow from the tip region of the rotor blades. The annular channel is bounded by a pair of circumferentially extending walls, at least one of which has acoustic treatment to absorb tonal and broadband noise.

15 Claims, 6 Drawing Sheets

NOISE REDUCING STATOR ASSEMBLY FOR A GAS TURBINE ENGINE

CROSS REFERENCE TO RELATED APPLICATIONS

This application claims the benefit of U.S. Provisional Application Ser. No. 60/028,907, filed Oct. 21, 1996. This application also relates to U.S. application Ser. No. 08/780,075, filed on even date herewith for STATOR ASSEMBLY FOR THE FLOW PATH OF A GAS TURBINE ENGINE by Donald B. Hanson and commonly assigned to United Technologies Corporation.

TECHNICAL FIELD

The present invention relates generally to gas turbine engines having a working medium flow path, a rotor assembly which includes arrays of rotor blades and a stator assembly which includes arrays of stator vanes, and more particularly to a stator assembly of the type having an annular channel in the working medium flow path extending axially from a location between the array of rotor blades and the array of stator vanes for reducing noise in the working medium flow path.

DESCRIPTION OF THE PRIOR ART

A gas turbine engine, such as a gas turbine engine for an aircraft, includes a fan section, a compression section, a combustion section, and a turbine section. An annular flow path for working medium flow gases extends axially through the sections of the engine. The engine has a rotor assembly which includes arrays of rotor blades and a stator assembly which includes arrays of stator vanes.

The rotor assembly in the fan section has an axis of rotation and includes arrays of rotor blades angled with respect to the approaching flow. The blades are rotatable about the axis of rotation of the engine. An array of stator vanes is disposed downstream of the rotor array to receive and redirect the flow. The stator assembly includes an outer wall and an inner wall which extend circumferentially with respect to the flow path to bound the flow path for working medium gases.

As the working medium gases are flowed along the flow path, the gases are pressurized in the fan and compression section causing the temperature and the pressure of the gases to rise. The hot, pressurized gases are burned with fuel in the combustion section to add energy to the gases. These gases are expanded through the turbine section to produce useful work for pressurizing the gases in the fan and compression sections and thrust for propelling the gas turbine engine.

The rotor assembly extends axially through the engine to transfer the work of pressurization from the turbine section to the fan section. As the blades in the fan section are rotated about the axis of rotation, the blades do work on the gases to increase the pressure of the gases. The flow of these gases through the engine and the passage of the blades through the gases are accompanied by the generation of acoustic energy or noise. In addition, the interaction of the stator components and other rotor components with the gases generates acoustic vibrations and noise.

Noise is a source of concern to the manufacturers of aircraft and aircraft engines. The manufacturers are especially concerned with the adverse effect of excessive levels of noise on passengers, aircraft personnel and residents in close proximity to airports. As a result of noise restrictions placed upon the use of aircraft in certain areas and at certain times, a need has existed and continues to exist for quieter aircraft engines.

The principal sources of noise in a jet engine are: jet or exhaust noise, core noise, and fan noise. Jet noise results from mixing of the high-velocity exhaust stream with the ambient air. A considerable amount of turbulence is generated when these two streams mix at different velocities, and hence the noise. With the introduction of the turbofan engine, there are two exhaust streams, therefore two sources of external noise. One source is the turbulent mixing of the fan exhaust stream with the ambient air. The other source is the turbulent mixing of the core exhaust stream with the fan exhaust stream and the ambient air.

Core noise consists of compressor noise, combustion noise and turbine noise. Compressor and turbine noise are caused by unsteady blade forces and fluid stresses when fluids are compressed or used to drive the turbines. Combustion noise results from the turbulence generated by the burning of fuel in the combustion chamber.

Fan noise is one of the major, if not the predominant, sources of noise in a high-bypass ratio turbofan engine. Separate and distinct mechanisms contribute to fan noise which can be categorized into discrete tone noise and broadband noise. Discrete tone noise is a noise of a specific frequency from wakes of rotor blades and has a distinct signal or sound that can be heard above the background noises. Wakes from rotor blades, sweeping past stator vanes, produce pressure fluctuations on the vane surfaces; fluctuating aerodynamic pressure on the surfaces of airfoils, either stationary vanes or rotating blades, produces forces which in turn generate noise. Propagation of this noise from the engine relates to the number of vanes and blades of the engine, the geometry of walls bounding the flow path for working medium gases, velocity of the gases and rotor speed.

Broadband noise, rather than being at a discrete frequency, is distributed over a range of frequencies, such as the noise produced by the work of the engine on the gases which are flowed through the engine to produce thrust. Broadband noise is essentially the noise generated from the turbulence in the working medium gases as they pass across the rotor blade and stator vane surfaces. Broadband noise is greater at the tip region of the rotor blade.

It is difficult to suppress fan noise because of the interdependence of the mechanisms which contribute to this noise and the basic aerodynamic operation of the fan. Much work has been done on designing turbofan and turbojet aircraft engines to reduce noise levels. The prior art contains many instances of structure adapted specifically for retrofit or original fit on a turbine engine to suppress engine noise. Typically, the noise suppression structure consists of sound attenuating liners applied to the nose cowl, the nose dome and the fan flow path components of the engine. In typical constructions the sound absorption material is used to line the inlet duct and nozzle of a turbojet or turbofan engine in order to suppress the noise generated within the flow path. However, significant aerodynamic losses result from the addition of enough noise suppression structure to provide acceptable levels of tonal and broadband noise.

One approach to reducing noise levels is discussed in U.S. Pat. No. 3,820,628 entitled "Sound Suppression Means For Rotating Machinery", issued to the present inventor Donald B. Hanson and assigned to the assignee of this application. In Hanson, boundary layer control is used in a fan to reduce the noise generated in the fan flow path by structures such as flow splitters, inlet guide vanes, fan blading coming into contact with the airstream. The strata of boundary layer in the fan flow path adjacent the structures, whether inlet guide vanes, outlet guide vanes, or flow splitters, communicate with openings formed in the structures. The structures are designed to contain sound suppression means or material. The working medium gases are flowed through the sound suppression means by a suction pump so as to remove the boundary layer and thereby reduce the attendant wakes.

This above art notwithstanding, scientists and engineers working under the direction of Applicant's assignee are seeking to reduce the level of noise for a given aerodynamic loss in a gas turbine engine.

SUMMARY OF THE INVENTION

This invention is in part predicated on the recognition that the contribution to thrust of flow discharged from the tip region of rotor blades in a compression section is less than the contribution from an equivalent amount of flow from other locations of the rotor blade and that acoustic treatment disposed in the outermost twenty percent (20%) of the flow path provides a greater level of noise reduction for such flow as compared with acoustic treatment disposed in other locations of the flow path for a given aerodynamic loss connected with such structure.

According to the present invention, a gas turbine engine having an annular flow path for working medium gases includes an array of rotor blades, an array of stator vanes downstream from the rotor blades and an annular channel extending radially and circumferentially within the outermost twenty percent (20%) of the working medium flow path, the annular channel extending rearwardly from a location between the blades and the vanes for capturing a significant portion of the wake turbulent flow from the tip region of the rotor blades, the channel being bounded by a pair of circumferentially extending walls at least one of which has acoustic treatment to absorb tonal and broadband noise.

In accordance with one particular embodiment of the invention, the inner wall of the annular channel is supported by the stator vanes and extends axially to split the flow path, the inner wall has a normalized length $L_n$ (normalized by dividing the axial length of the wall by the axial chord length of the stator vanes) that is at least fifteen (15) times greater than the normalized height $H_n$ of the channel (normalized by dividing the radial height of the channel by the radial span of the stator vanes) and the ratio of the absolute axial length $L_C$ of the channel parallel to the flow to the absolute radial height $H_C$ perpendicular to the flow is greater than three (3).

A primary feature of the present invention is an array of rotor blades disposed about an axis of rotation, each rotor blade having a chord length $b_r$ as measured parallel to the axial direction. Another feature is an array of stator vanes downstream from the rotor blades, each stator vane having a chord length $b_V$ as measured in the axial direction and a radial span S as measured at the leading edge. Another feature is an annular flow path for working medium gases which extends through the array of rotor blades and array of stator vanes. An annular channel extends rearwardly from a location between the rotor blades and stator vanes and extends radially and circumferentially within the outermost twenty percent (20%) of the working medium flow path. The inlet of the annular channel is spaced axially from the rotor blades such that the distance between the rotor blades and the leading edge of the inlet to the annular channel is less than four chord lengths ($4b_r$) of the rotor blade. The annular channel is bounded by an outer duct wall and a wall spaced radially inward from the outer duct wall that is supported by the stator vanes. The annular channel has an axial length $L_C$ parallel to the axis of rotation and a radial height $H_C$ perpendicular to the axis of rotation. In one detailed embodiment the annular channel has a ratio of the axial length to the radial height ($L_C/H_C$) greater than three (3). Acoustic treatment is present on at least one wall. In one detailed embodiment the normalized length $L_n$ ($Ln=L_C/b_V$ where length of inner wall $L_W=L_C$) of the inner wall is at least fifteen (15) times greater than the normalized height $H_n$ ($H_n=H_C/S$)of the annular channel.

A primary advantage of the present invention is the level of tonal and broadband noise in a gas turbine engine which results from capturing wake turbulent flow from the tip region of an array of rotor blades in an annular channel and disposing structure within the chamber to decrease the level of noise in the channel. Another advantage is the aerodynamic efficiency of the engine for a given level of tonal and broadband noise which results from treating wake turbulent flow from the tip region of the rotor blades and the effect on thrust of drag losses from such flow. In one embodiment the aerodynamic efficiency is increased by the lack of sound attenuation structure in the inner wall of the annular chamber.

The foregoing and other objects, features and advantages of the present invention will become more apparent in the light of the following detailed description of the best mode for carrying out the invention and from the accompanying drawings which illustrate an embodiment of the invention.

BEST MODE FOR CARRYING OUT THE INVENTION

Figure 1:
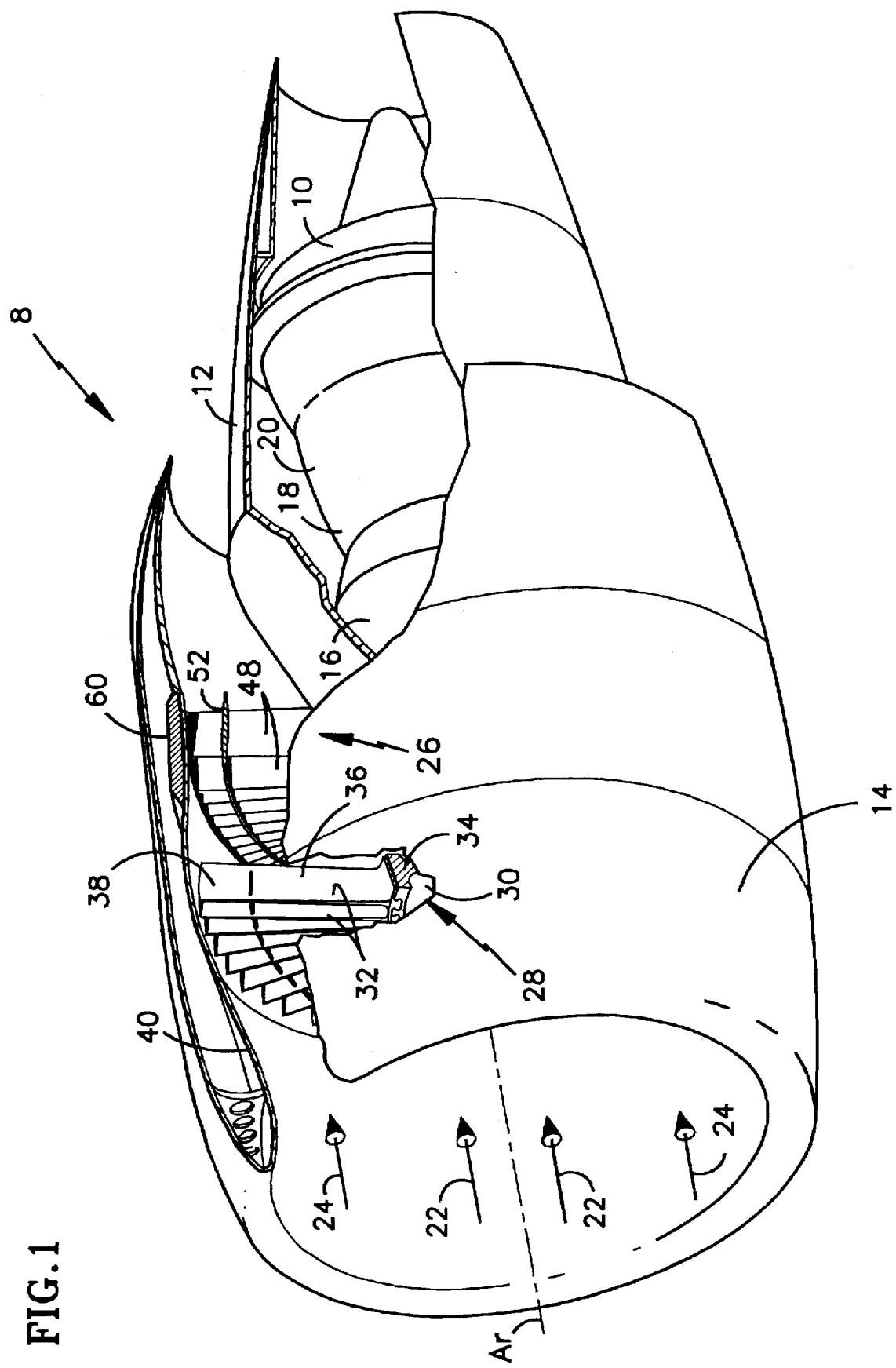
FIG. 1 is a partial perspective view of a gas turbine powerplant of the axial flow, turbofan type which includes a gas turbine engine and a nacelle with portions of the nacelle and engine broken away to show a portion of the secondary flow path for working medium gases and an array of rotor blades and stator vanes.

FIG. 1 shows a gas turbine powerplant 8 of the axial flow, turbofan type having an axis of rotation. The powerplant includes an engine 10 and a nacelle 12. The engine is formed of a fan section 14, a compressor section 16, a combustion section 18 and a turbine section 20. A primary flow path 22 for working medium gases extends rearwardly through these sections. A secondary flow path 24 for working medium gases is outwardly of the primary flow path.

The nacelle 12 circumscribes the engine and is adapted to both support and position the engine from a support structure such as an aircraft wing. The engine 10 and nacelle include a stator assembly 26 extending circumferentially about an axis of rotation $A_r$ to bound the working medium flow path. As used herein, the term "engine" includes the engine and portions of the nacelle integral with the engine which bounds the secondary flow path. A rotor assembly 28 is disposed about the axis of rotation $A_r$. The rotor assembly includes a rotor disk 30 and a plurality of rotor blades 32. Each rotor blade extends outwardly from the disk across the working medium flow paths 22, 24 into proximity with the stator assembly.

Figure 2:
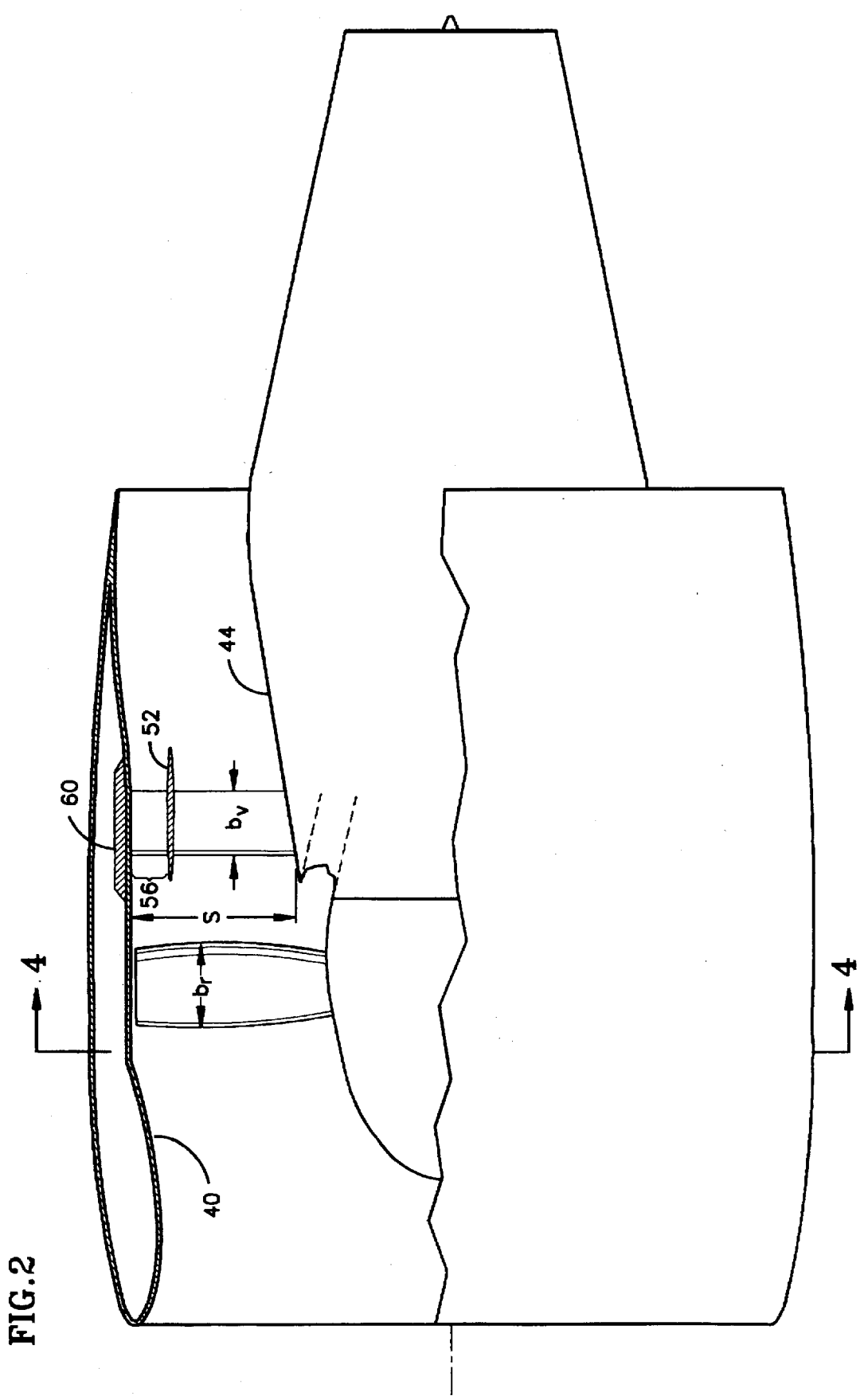
FIG. 2 is a side elevation view of the gas turbine powerplant shown in FIG. 1 with portions of the powerplant broken away for clarity.

FIG. 2 is a side elevation view of the stator assembly of the axial flow gas turbine engine 10 shown in FIG. 1. The stator assembly 26 includes an outer wall 40 which extends circumferentially about the axis of rotation of the engine. The outer wall outwardly bounds the annular flow path for working medium gases. An inner wall 44 is spaced radially inwardly from the outer wall. The inner wall extends circumferentially about the axis of rotation and inwardly bounds the flow path for working medium gases. As shown, the annular flow path 24 for working medium gases has a height $H_D$ as measured at the inlet to the stator assembly.

Each rotor blade 32 of the rotor assembly has a root region 34, a mid-span region 36 and a tip region 38. The tip region is in close proximity with the outer wall. The rotor blade has a chord length $b_r$ as measured in the axial direction and radially at the mid-span location. An array of stator vanes 48 is spaced axially downstream from the array of rotor blades. Each stator vane extends radially inwardly from the outer wall to the inner wall across the annular flow path 24. The stator vane has a chord length $b_V$, as measured in the axial direction and radially at the mid-span location. The stator vane has a radial span S as measured at the leading edge.

An intermediate wall 52 extends axially to split the flow path. The intermediate wall is spaced radially inwardly from the outer wall 40 leaving an annular channel 56 therebetween.

Figure 3:
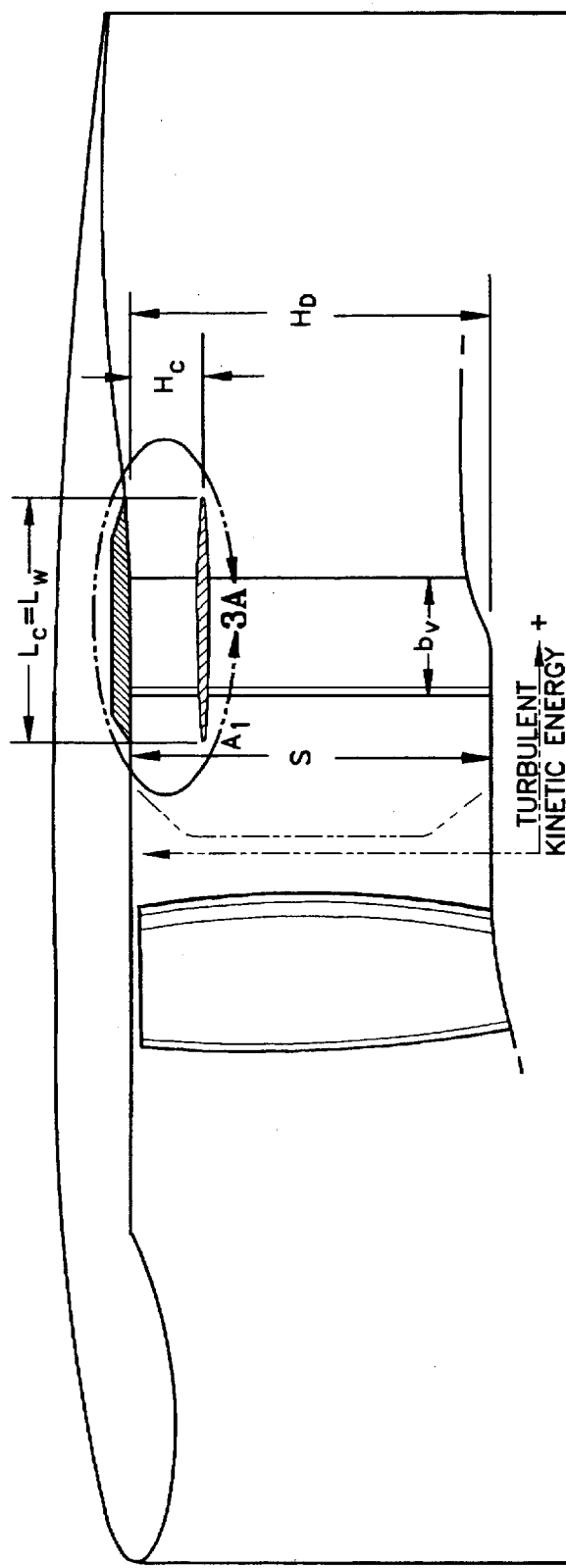
FIG. 3 is an enlarged view of a portion of the gas turbine powerplant shown in FIG. 2 and shows diagrammatically the variation in turbulent kinetic energy of the flow as a function of spanwise location.
Figure 3A:
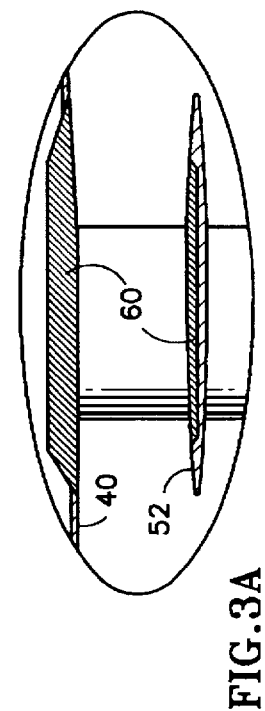
FIG. 3A is an enlarged view of a portion of the gas turbine powerplant shown in FIG. 3 taken along the line 3A of FIG. 3.

FIG. 3 is an enlarged view of a portion of the gas turbine engine 10 shown in FIG. 2 showing in more detail the relationship of the annular flow path to the components of the stator assembly. The annular channel 56 is outwardly bounded by the outer wall 40 and inwardly bounded by the intermediate wall 52. The intermediate wall is integrally attached to at least one of the stator vanes 48. The intermediate wall has a length axial $L_W$, and a normalized length $L_n$ that is equal to the axial length $L_W$ divided by the axial chord $b_V$ of the stator ($L_n = L_W/b_V$). The ratio of the normalized length $L_n$ is at least fifteen (15) times greater than the normalized height $H_n$ of the annular channel 56 by reason of the height of the channel.

The annular channel 56 extends axially from a first location $A_1$ disposed between the blades 32 and vanes 48 and extends radially and circumferentially within the outermost twenty percent (20%) of the working medium flow path 24. The annular channel has a normalized height $H_n$ that is equal to the radial height of the channel divided by the radial span of the stator vanes ($H_n = H_C/S$). The channel has an inlet with a leading edge spaced axially from the rotor blades such that the distance between the rotor blades and the leading edge of the inlet to the annular channel at the first location is less than four chord lengths ($4b_r$) of the rotor blade. The annular channel has an axial length $L_C$ as measured axially. In the embodiment shown, the distance is the same as measured substantially parallel to the flow. The channel has a radial height that is less than or equal to twenty percent (20%) of the height of the working medium flow path $H_D$ ($H_C \geq 0.20 H_D$) as measured radially. In the embodiment shown, the distance is the same as measured substantially perpendicular to the flow. The aspect ratio of the channel is equal to the axial length $L_C$ of channel to the radial height $H_C$ of channel. This aspect ratio of the channel is greater than three ($L_C/H_C > 3$).

At least one of the walls bounding the annular channel 56 has sound permeable structure 60 disposed therein. In the embodiment shown, both the walls 40, 52 bounding the annular channel have sound permeable structure disposed therein.

Figure 4:
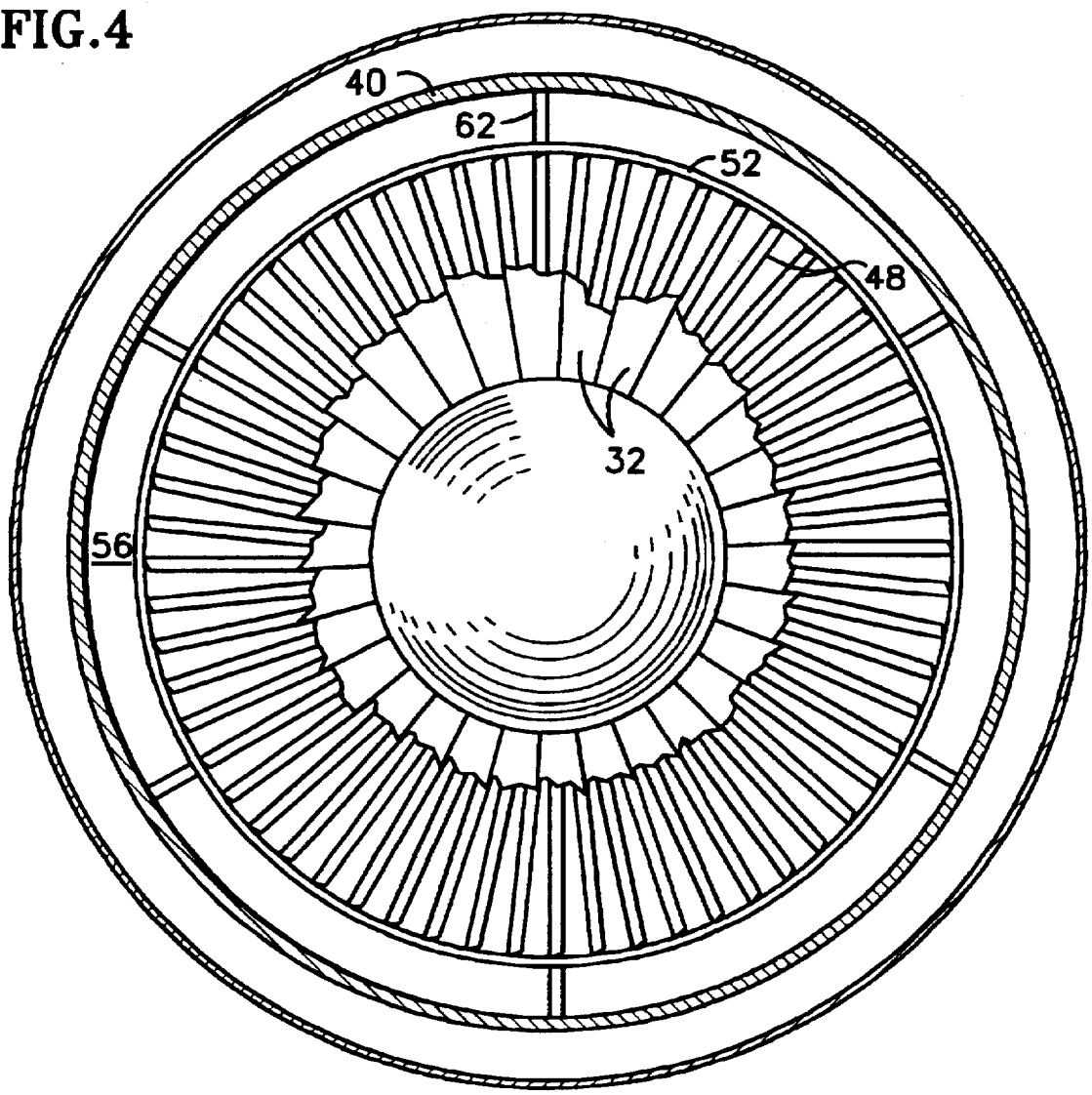
FIG. 4 is a cross-sectional view of an alternate embodiment of the powerplant shown in FIG. 2 corresponding to a view taken along the lines 4—4 of FIG. 2.

FIG. 4 is a cross-sectional view of an alternate embodiment of the engine shown in FIG. 2 corresponding to a view taken along the lines 4—4 of FIG. 2. In this embodiment an array of a number of stator vanes 48 extends radially inwardly from the intermediate wall 52 across the annular flow path 24 to the inner wall 44. The array of stator vanes is spaced axially downstream from the rotor blades 32. Each stator vane has a chord length $b_V$, as measured in the axial direction and a radial span S as measured at the leading edge. At least one of the stator vanes is adapted to engage the intermediate wall.

An array of a number of struts 62 extends radially outwardly from the intermediate wall 52 across the annular flow path 24 to the outer wall 40. The array of struts is axially downstream of the array of rotor blades 32. The intermediate wall is outwardly attached and supported by at least one strut extending across the annular channel. The intermediate wall is integrally attached to and inwardly supported by at least one stator vane 48 extending radially across the annular flow path. The number of struts is less than the number of vanes supporting the intermediate wall. One example of a strut is one having an aerodynamic contour which is identical to the stator vane.

During operation of the gas turbine engine, the working medium gases are compressed in the fan section 14 and the compressor section 16. The gases are burned with fuel in the combustion section 18 to add energy to the gases. The hot, high pressure gases are expanded through the turbine section 20 to produce thrust and useful work. The work done by expanding gases drives rotor assemblies in the engine, such as the rotor assembly 28 extending to the fan section, about the axis of rotation $A_r$.

The gases are flowed along the working medium flow path at high velocities into the rotor assembly 28. As the rotor assembly is rotated at high speed, the rotor blades 32 travel at high velocities about the axis of rotation to compress the working medium gases in the primary flow path 22 and the secondary flow path 24. The rotor blades passing through the gases at high velocities generate acoustic energy or noise.

As each rotor blade 32 passes through the gases, the blade leaves a wake or track of turbulent gases behind the blade which is commonly referred to as wake turbulent flow. This wake turbulent flow from rotor blades 32 sweeping past stator vanes 48 produces pressure fluctuations on the vane surfaces. Fluctuating aerodynamic pressure on the surfaces of the stator vanes, produces forces which in turn generates additional noise. In addition, the tip region 38 has secondary flow patterns adjacent the tips of the rotor blades due to the interaction of the rotor blade with the outer wall boundary layer 40. This interaction introduces further turbulence into the wake turbulent flow at the tip region.

Figure 6:
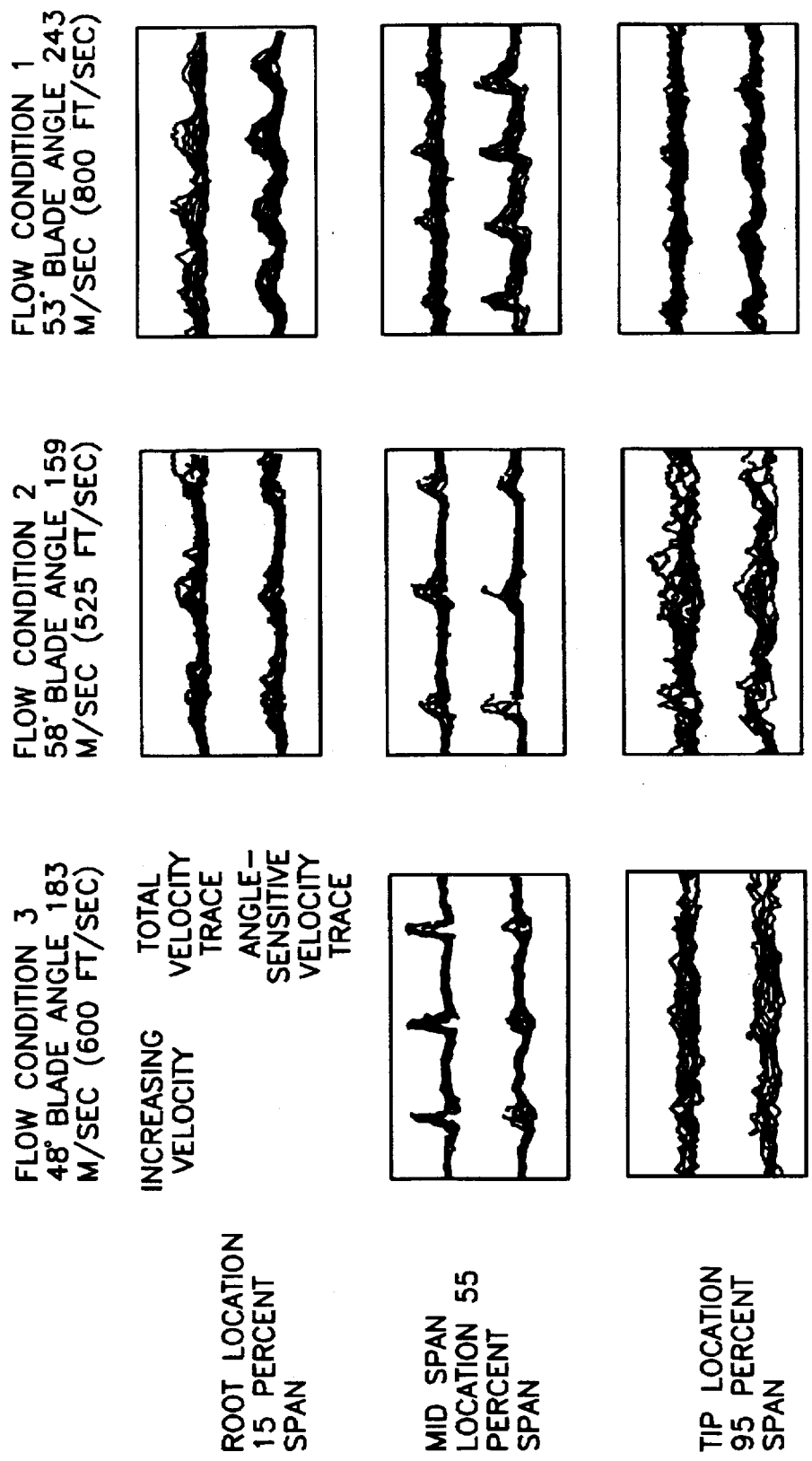
FIG. 6 is a graph of oscilloscope traces from a hot wire probe showing that the wake turbulent flow varies dramatically across the span of the stator inlet being most turbulent at the tip region.

FIG. 6 shows oscilloscope traces from a hot wire probe showing that the characteristics of the wake turbulent flow vary dramatically with time and with radial location across the span of the stator 48 inlet. The modulation in amplitude and time is due to the turbulence associated with this flow. In particular, FIG. 6 shows the traces for three flow conditions at the root region 34, mid-span region 36, and tip region 38 of the rotor blade.

At the mid-span region 36 the wakes of turbulent flow are seen to be isolated or distinct. A periodic pattern can be seen in this region. In the root region 34 the wakes are nearly merged and highly turbulent; however, a periodic pattern can be ascertained. As shown in FIG. 6, the wake turbulent flow is most turbulent at the tip region 38. At the tip region, the individual blade wakes are nearly indistinguishable in the turbulence. No periodic pattern can be ascertained in the tip region of the rotor blade 32.

Figure 5:
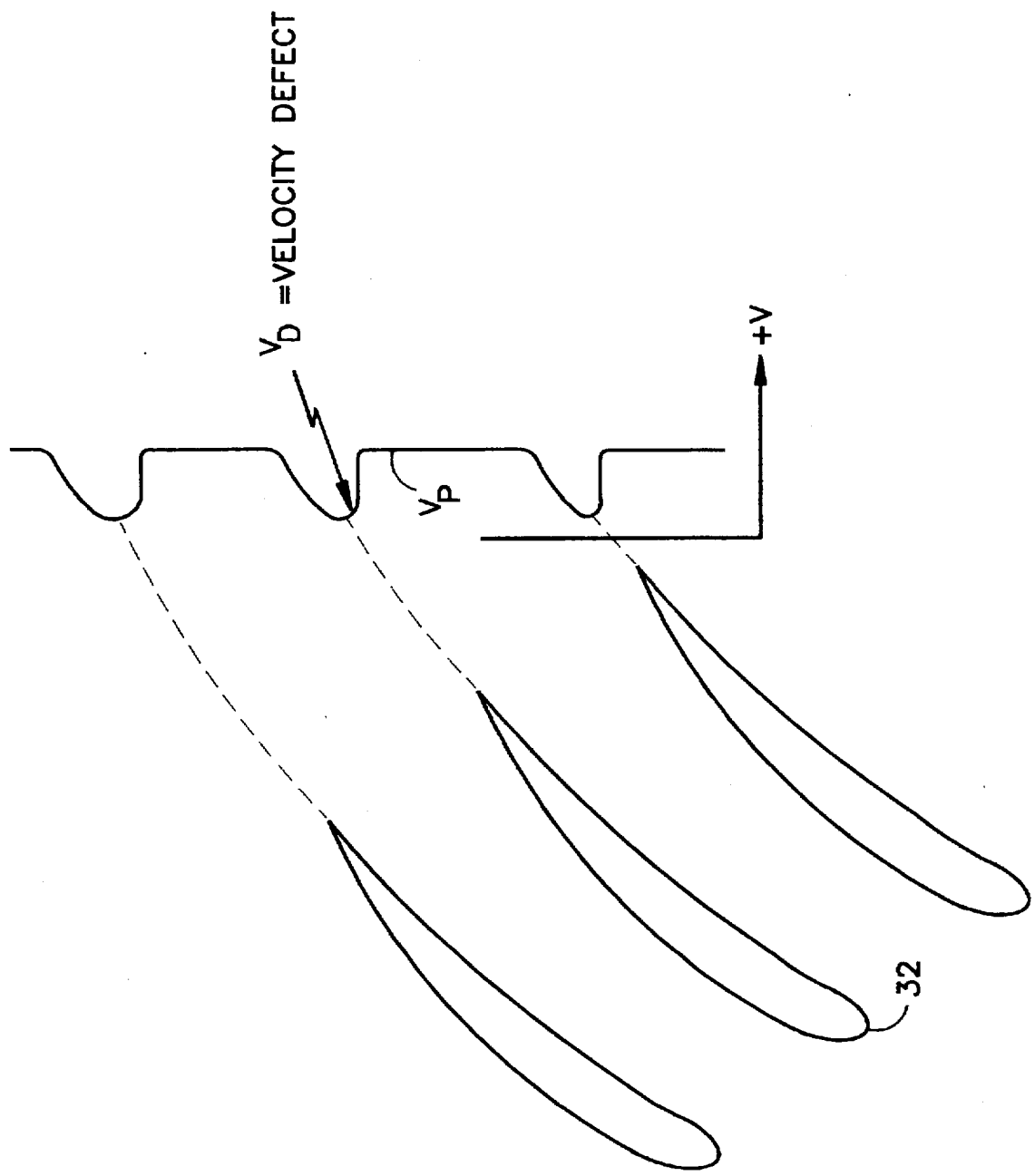
FIG. 5 is a developed view schematically showing the wake velocity profile of the tip region in the axial direction.

The characteristics of the wake turbulent flow have been studied to understand the role of this flow in the generation of noise at the stator vanes 48. Wake turbulent flow has two components: a random component and a steady component. The steady component is shown in FIG. 5 which is a developed view schematically showing the wake velocity profile $V_P$ of the tip region in the axial direction. In the velocity profile, velocity defects $V_D$ are localized areas of decreased velocity corresponding to the tip regions 38 of the rotor blades 32. These velocity defects comprise the steady component of the flow. The steady component is also commonly referred to as the harmonic wake component.

The random component of the wake turbulent flow is represented by the turbulent kinetic energy plotted in FIG. 3. As shown in FIG. 3, the turbulent kinetic energy varies dramatically across the span of the stator 48 inlet. The turbulent kinetic energy is much greater at the root region 34 and tip region 38 of the rotor blade 32 than at the mid-span region 36 of the rotor blade. The turbulent kinetic energy present in the root region of the rotor blades is attenuated by being absorbed into the low pressure compressor. The random component is also commonly referred to as the broadband wake component.

The two components of the wake turbulent flow, harmonic (steady) and broadband (random) components, are related to components of the noise spectrum. The harmonic wake component causes harmonic or tonal noise and the broadband wake component causes broadband noise.

The inner 52 and outer walls 40 of the annular channel 56 formed within the outermost twenty percent (20%) of the working medium flow path 24 capture a significant portion of the wake turbulent flow discharged from the tip region 38 of the rotor blades 32. The captured turbulent flow is flowed through the channel where it is forced to interact with the sound absorption structure. Acoustic energy from the gases passing through the channel is absorbed by the sound permeable structure as the turbulent gases impinge on the surfaces of the stator assembly 26. The large aspect ratio of the normalized length to normalized height of the annular channel by reason of the height of the channel provides for increased interaction of the acoustic waves with the sound absorption structure 60 while only capturing flow in the outermost portion of the working medium flow path.

Turbulent flow also produces drag losses and noise when interacting with stator vanes 48 and adjacent structure. Due to its turbulent nature, the flow in the outermost portion has high aerodynamic losses as compared to the remainder of the flow as dynamic pressure is converted to static pressure (thrust). Accordingly, this tip flow provides a smaller contribution to thrust than does a like amount of the remainder of the flow. And due to its turbulent nature, the flow in the outermost portion provides a large contribution to fan noise. It is therefore aerodynamically efficient to treat the excessive noise energy in this outer region while accepting the reduced thrust potential. By accepting a reduced amount of thrust, structure 60 is provided for increasing sound attenuation of the flow. Therefore, the penalty in thrust is not as high when the wake turbulent flow at the tip region, after sound attenuation, is discharged from the engine.

Thus, the most turbulent portion of wake is treated with sound absorbing structure 60 to reduce noise before the noise escapes into the general fan flow path. This is accomplished by at least one of the walls bounding the annular channel 56 having sound permeable structure disposed therein. As will be realized, alternate constructions of the present invention may have a channel whose height is less than twenty percent (20%) of the height $H_D$ of the working medium flow path. Such constructions will have less attenuation of noise than other constructions within twenty percent of the height $H_D$ (that is less than or equal to twenty percent of the height $H_D$) but will have less aerodynamic drag by reason of the reduced mass flow through this smaller channel.

The detailed embodiment shown in FIG. 4, shows the number of radial airfoil surfaces 62 in the outermost portion of the working medium flow path 24 are reduced thereby reducing noise generation due to a fewer number of these radial airfoil surfaces upon which the wake turbulent flow can impact. This also reduces the recovery of static pressure and therefore thrust by reducing the conversion of dynamic pressure to static pressure in the channel 56 formed in this outermost portion of the flow path. However, as the outermost portion provides a small contribution to thrust, it is efficient to decrease the generation of noise energy in this outer region by reducing the number of radial airfoil surfaces in this region.

In summary, because the outermost portion of the flow does not provide as great a contribution to thrust because of its turbulence as does flow inwardly of the wake region, treatment to dissipate the acoustic energy within the outermost twenty percent (20%) does not interfere with engine thrust as would such treatment elsewhere along the span. Alternatively, the number of leading edges interacting with the turbulent flow are reduced in the annular channel 56 which reduces thrust. However, the wake turbulent flow does not impact many strut 62 surfaces and less acoustic energy is generated.

Although the invention has been shown and described with respect to detailed embodiments thereof, it should be understood by those skilled in the art that various changes in form and detail thereof may be made without departing from the spirit and the scope of the claimed invention.

What is claimed is:

1. A stator assembly for a gas turbine engine having an axis of rotation $A_r$, a flow path for working medium gases disposed about the axis of rotation, a first outer wall extending circumferentially about the axis of rotation and outwardly bounding the flow path for working medium gases, an array of rotor blades having an axial location, each rotor blade extending radially outwardly across the flow path and having a tip region such that the tip region is in close proximity with the outer wall, an array of stator vanes spaced axially downstream from the array of rotor blades, each stator vane extending radially inwardly across the flow path, a second wall extending axially to split the flow path into a first annular channel and a second annular channel, the second wall being spaced radially inwardly from the first outer wall leaving the first channel therebetween, the first channel being outwardly bounded by the first outer wall and inwardly bounded by the second wall, the second wall being integrally attached to the stator vanes, said stator assembly characterized by:

the first channel extending axially from an axial location that is disposed between an axial location between the blades and vanes and said channel extending radially and circumferentially and disposed entirely within the outermost twenty percent (20%) of the working medium flow path, wherein at least one of said walls bounding the annular channel has sound absorbing structure disposed therein, and wherein the outer wall and the second wall of the channel capture turbulent flow discharged into the outer portion of the flow path from the tip region of the rotor blades, for absorbing acoustic energy from the gases passing through the channel as the turbulent gases impinge on the surfaces of the first outer wall and the second wall.

2. The stator assembly of claim 1, wherein each stator vane further has a leading edge, a trailing edge, a chord length $b_v$ as measured in the axial direction and a radial span S as measured at the leading edge, the first channel further has an axial length $L_C$, a radial height $H_C$, normalized length $L_n$ that is equal to the length of second wall divided by the axial chord of the stator vane ($L_n = L_w/b_v$), a normalized height $H_n$ of the first channel that is equal to the radial height of the first channel divided by the radial span of the stator vane ($H_n = H_C/S$), characterized by the ratio of the normalized length of the first channel being at least fifteen (15) times greater than the normalized height of the first channel by reason of the height of the first channel which provides for increased interaction of the acoustic waves with the sound absorption structure.

3. The stator assembly of claim 2, wherein the stator assembly further includes an inner wall spaced radially inwardly from the first outer wall, the inner wall extending circumferentially about the axis of rotation and inwardly bounding the working medium gases, and wherein each rotor blade further has a leading edge, a trailing edge, a chord length $b_r$ as measured in the axial direction, characterized by the inlet of the first channel being spaced axially from the trailing edge of the rotor blades such that the distance between the rotor blades and the inlet to the first channel is less than four chord lengths of the rotor blade, and the stator vanes extend from the inner wall to the first outer wall and are integrally attached thereto.

4. The stator assembly of claim 2, characterized by the ratio of the axial length of the first channel $L_C$ to said first channel radial height of said first channel $H_C$ being greater than 3 ($L_C/H_C > 3$).

5. The stator assembly of claim 3, characterized by the ratio of the axial length of the first channel $L_C$ to the radial height of said first channel $H_C$ being greater than 3 ($L_C/H_C > 3$).

6. The stator assembly of claim 2, characterized by the stator vanes extending radially from the inner wall to the second wall, a lesser number of struts extending radially outwardly from the second wall to the first outer wall and wherein sound energy discharged from the tip region of the rotor blades impacts on a lesser number of radially extending surfaces in the first channel.

7. The stator assembly of claim 1, wherein the gas turbine engine includes a portion of nacelle structure which is integrally attached to the gas turbine engine and which bounds the working medium flow path to form at least a part of the outer wall, and the first channel is further characterized by the outer wall and the second wall of the first channel having sound absorbing structure disposed therein.

8. A stator assembly for a gas turbine engine having an axis of rotation $A_r$ and which has an annular flow path for working medium gases disposed about the axis of rotation which has a height $H_D$, the stator assembly extending circumferentially about the axis of rotation of the engine and bounding the flow path, comprising:

an outer wall extending circumferentially about the axis of rotation and outwardly bounding the annular flow path for working medium gases;

an inner wall spaced radially inwardly from the outer wall, the inner wall extending circumferentially about the axis of rotation and inwardly bounding the working medium gases;

an array of rotor blades, each rotor blade having a tip region and extending radially outwardly across the annular flow path such that the tip region is in close proximity with the outer wall, and having a chord length $b_r$ as measured in the axial direction;

an array of a number of stator vanes spaced axially downstream from the array of rotor blades, each stator vane extending radially inwardly across the annular flow path to the inner wall and having a chord length $b_v$ as measured in the axial direction and a radial span S as measured at the leading edge, at least one of which is adapted to integrally engage an intermediate wall;

an array of a number of struts spaced axially downstream from the array of rotor blades, each strut extending radially inwardly across the annular flow path and being adapted to engage an intermediate wall;

a circumferentially extending intermediate wall spaced radially from the outer wall leaving an annular channel therebetween, the intermediate wall being integrally attached to and inwardly supported by at least one of said stator vanes extending radially across the annular flow path and being integrally attached to and outwardly supported by a number of struts extending across the annular channel, the intermediate wall having a length $L_w$, and a normalized length $L_n$ that is equal to the length of the intermediate wall divided by the axial chord of the stator vane ($L_n = L_w/b_v$);

said annular channel being outwardly bounded by the outer wall and inwardly bounded by the intermediate wall and extending axially from a location disposed between the blades and vanes, said channel extending radially and circumferentially and disposed entirely within the outermost twenty percent (20%) of the working medium flow path having an inlet spaced axially from the trailing edge of the rotor blades such that the distance between the rotor blades and the inlet to the annular channel is less than four chord lengths ($4b_r$) of the rotor blade, an axial length $L_C$ that is equal to the axial length of the intermediate wall $L_w$ ($L_C = L_w$), a radial height of the channel that is less than or equal to 0.20 times the height $H_D$ of the working medium flow path ($H_C < 0.20\ H_D$) perpendicular to the flow, a normalized height of the channel that is equal to the radial height of the channel divided by the radial span of the stator vane ($H_n = H_c/S$), a ratio of the axial length of the channel to the radial height of the channel being greater than 3 ($L_c/H_c > 3$), wherein at least one of said walls bounding said annular channel has sound absorbing structure disposed therein, wherein the inner and outer wall of the annular channel capture turbulent flow discharged into the outer portion of the flow path from the tip region of the rotor blades, for absorbing acoustic energy from the gases passing through the channel as the turbulent gases impinge on the surfaces of the outer wall and the intermediate wall, and wherein the number of struts is less than the number of vanes to provide a fewer number of radially extending surfaces upon which the flow may impact.

9. A stator assembly for a gas turbine engine having an axis of rotation $A_r$ and which has an annular flow path for working medium gases disposed about the axis of rotation which has a height $H_D$, the stator assembly extending circumferentially about the axis of rotation of the engine and bounding the flow path, which comprises:

an outer wall extending circumferentially about the axis of rotation and outwardly bounding the annular flow path for working medium gases;

an inner wall spaced radially inwardly from the outer wall, the inner wall extending circumferentially about the axis of rotation and inwardly bounding the working medium gases;

an array of rotor blades, each rotor blade having a tip region and extending radially outwardly across the annular flow path such that the tip region is in close proximity with the outer wall, and having a chord length $b_r$ as measured in the axial direction;

an array of stator vanes spaced axially downstream from the array of rotor blades, each stator vane extending radially inwardly across the annular flow path to the inner wall and having a chord length $b_v$ as measured in the axial direction and a radial span S as measured at the leading edge;

an intermediate wall extending axially to split the flow path, the intermediate wall being spaced radially inwardly from the outer wall leaving an annular channel therebetween, the annular channel being outwardly bounded by the outer wall and inwardly bounded by the intermediate wall, the intermediate wall being integrally attached to the stator vanes and having a length $L_w$, and a normalized length $L_n$ that is equal to the length of intermediate wall divided by the axial chord of the stator vane ($L_n = L_w/b_v$);

said annular channel extending axially from a location disposed between the blades and vanes and said channel extending radially and circumferentially and disposed entirely within the outermost twenty percent (20%) of the working medium flow path having an inlet spaced axially from the trailing edge of the rotor blades such that the distance between the rotor blades and the inlet to the annular channel is less than four chord lengths ($4b_r$) of the rotor blade, an axial length $L_C$ that is equal to the axial length of the intermediate wall $L_w$ ($L_C = L_w$), a radial height $H_C$ of the channel that is less than 0.2 times the height $H_D$ of the working medium flow path ($H_C < 0.20\ H_D$), a normalized height $H_n$ of the channel that is equal to the radial height of the channel divided by the radial span of the stator vane ($H_n = H_c/S$), a ratio of the axial length of the channel to the radial height of the channel greater than 3 ($L_c/H_c > 3$), wherein the inner and outer wall of the annular channel capture turbulent flow discharged into the outer portion of the flow path from the tip region of the rotor blades, wherein at least one of said walls bounding the annular channel has sound absorbing structure disposed therein for absorbing acoustic energy from the gases passing through the channel as the turbulent gases impinge on the surfaces of the outer wall, the intermediate wall and the stator vanes and wherein the ratio of the normalized length $L_n$ is at least fifteen (15) times greater than the normalized height $H_n$ of the annular channel by reason of the height of the channel which provides for increased interaction of the acoustic waves with the sound absorption structure.

10. The stator assembly of claim 9, wherein the radial height $H_C$ of the channel is equal to 0.2 times the height $H_D$ of the working medium flow path ($H_C = 0.2H_D$).

11. A method for forming a flow path for working medium gases for a gas turbine engine having an axis of rotation Ar, and an outer wall extending circumferentially about the axis of rotation outwardly bounding the flow path, comprising the steps of:

disposing an array of rotor blades in the gas turbine engine, each rotor blade extending across the flow path and having a tip region;

disposing an array of stator vanes in the gas turbine engine spaced axially downstream from the array of rotor blades, each stator vane extending across the flow path;

disposing an intermediate wall radially inwardly from the outer wall such that the intermediate wall and the outer wall form an annular channel entirely within the radially outermost twenty percent (20%) of the working medium flow path between the outer wall and intermediate wall; and disposing sound absorbing structure adjacent the annular channel to capture sound energy discharged from the tip region of the rotor blades, and forming at least a portion of the outer wall and at least a portion of the intermediate wall with sound absorbing structure.

12. The method for forming a flow path for working medium gases of claim 11, wherein the step of disposing an intermediate wall radially inwardly from the outer wall includes the step of integrally attaching the intermediate wall to the stator vanes, and wherein the step of disposing sound attenuation structure adjacent the annular channel includes the step of integrally attaching sound attenuation structure adjacent the annular channel to at least a portion of the outer wall and the intermediate wall to capture sound energy discharged from the tip region of the rotor blades.

13. The method for forming a flow path for working medium gases of claim 11, wherein the step of disposing an array of stator vanes in the gas turbine engine includes the step of each stator vane further having a leading edge, a trailing edge, a chord length $b_v$ as measured in the axial direction and a radial span S as measured at the leading edge, wherein the step of disposing an intermediate wall radially inwardly from the outer wall such that the intermediate wall and the outer wall form a channel includes the step of the channel further having an axial length $L_C$, a radial height $H_C$, normalized length $L_n$ that is equal to the axial length of the channel divided by the axial chord of the stator vane ($L_n=L_C/b_v$), a normalized height $H_n$ of the channel that is equal to the radial height of the channel divided by the radial span of the stator vane ($H_n=H_C/S$), and wherein the ratio of the normlwlized length of the channel is at least fifteen (15) times greater than the normalized height of the channel by reason of the height of the channel which provides for increased interaction of the acoustic waves with the sound absorption structure.

14. The stator assembly of claim 1, wherein the array of stator vanes extends radially inwardly across the flow path from the outer wall.

15. The stator assembly of claim 1, wherein the array of stator vanes extends radially inwardly across the flow path from the second wall.

* * * * *